(12) United States Patent
Benson et al.

(10) Patent No.: US 11,932,130 B2
(45) Date of Patent: Mar. 19, 2024

(54) MISSION-CRITICAL MICROGRID

(71) Applicants: Michael Benson, Wadsworth, OH (US); Robert Pursley, Barberton, OH (US)

(72) Inventors: Michael Benson, Wadsworth, OH (US); Robert Pursley, Barberton, OH (US)

(73) Assignee: Command Consulting, LLC, Wadsworth, OH (US)

( * ) Notice: Subject to any disclaimer, the term of this patent is extended or adjusted under 35 U.S.C. 154(b) by 0 days.

(21) Appl. No.: 17/959,763

(22) Filed: Oct. 4, 2022

(65) Prior Publication Data
US 2023/0166620 A1 Jun. 1, 2023

Related U.S. Application Data

(60) Provisional application No. 63/283,676, filed on Nov. 29, 2021.

(51) Int. Cl.
*B60L 55/00* (2019.01)
*B60L 53/51* (2019.01)
(Continued)

(52) U.S. Cl.
CPC .............. *B60L 53/60* (2019.02); *B60L 53/51* (2019.02); *B60L 53/52* (2019.02); *B60L 55/00* (2019.02);
(Continued)

(58) Field of Classification Search
CPC .......... B60L 53/51; B60L 53/52; B60L 53/60; B60L 55/00; H02J 3/381; H02J 2300/24; H02J 2300/28
(Continued)

(56) References Cited

U.S. PATENT DOCUMENTS

| | | |
|---|---|---|
| 9,787,117 B2 | 10/2017 | Bai et al. |
| 10,560,024 B2 | 2/2020 | Bai et al. |
| 10,749,347 B2 | 8/2020 | Maug et al. |

FOREIGN PATENT DOCUMENTS

WO WO-2023049998 A1 * 4/2023

* cited by examiner

*Primary Examiner* — Hal Kaplan
(74) *Attorney, Agent, or Firm* — Renner, Kenner, Grieve, Bobak, Taylor & Weber, Co., LPA

(57) ABSTRACT

A mission-critical microgrid comprising a renewable energy generator, a microgrid control and distribution unit, electric vehicle supply equipment, an energy storage system, and critical infrastructure electric service equipment. The renewable energy generator generates and provides direct current (DC) power that is then controlled and distributed by the microgrid control and distribution unit. The electric vehicle supply equipment receives DC power from the energy storage system through the microgrid control and distribution unit to be utilized to charge a mission-critical electric vehicle fleet. The mission-critical electric vehicle fleet supplies DC power through the electric vehicle supply equipment to the energy storage system through the microgrid control and distribution unit. The energy storage system receives, and stores DC power generated by the renewable energy generator through the microgrid control and distribution unit. The critical infrastructure electric service equipment receives alternating current (AC) power through the microgrid control and distribution unit that is inverted from the DC power created by the renewable energy generator and stored by the energy storage system, wherein the AC power is used to power a critical infrastructure.

4 Claims, 1 Drawing Sheet

Mission-Critical Microgrid 1000

(51) Int. Cl.
   *B60L 53/52* (2019.01)
   *B60L 53/60* (2019.01)
   *H02J 3/38* (2006.01)
(52) U.S. Cl.
   CPC ........... *H02J 3/381* (2013.01); *H02J 2300/24* (2020.01); *H02J 2300/28* (2020.01)
(58) Field of Classification Search
   USPC ....................................................... 307/10.1
   See application file for complete search history.

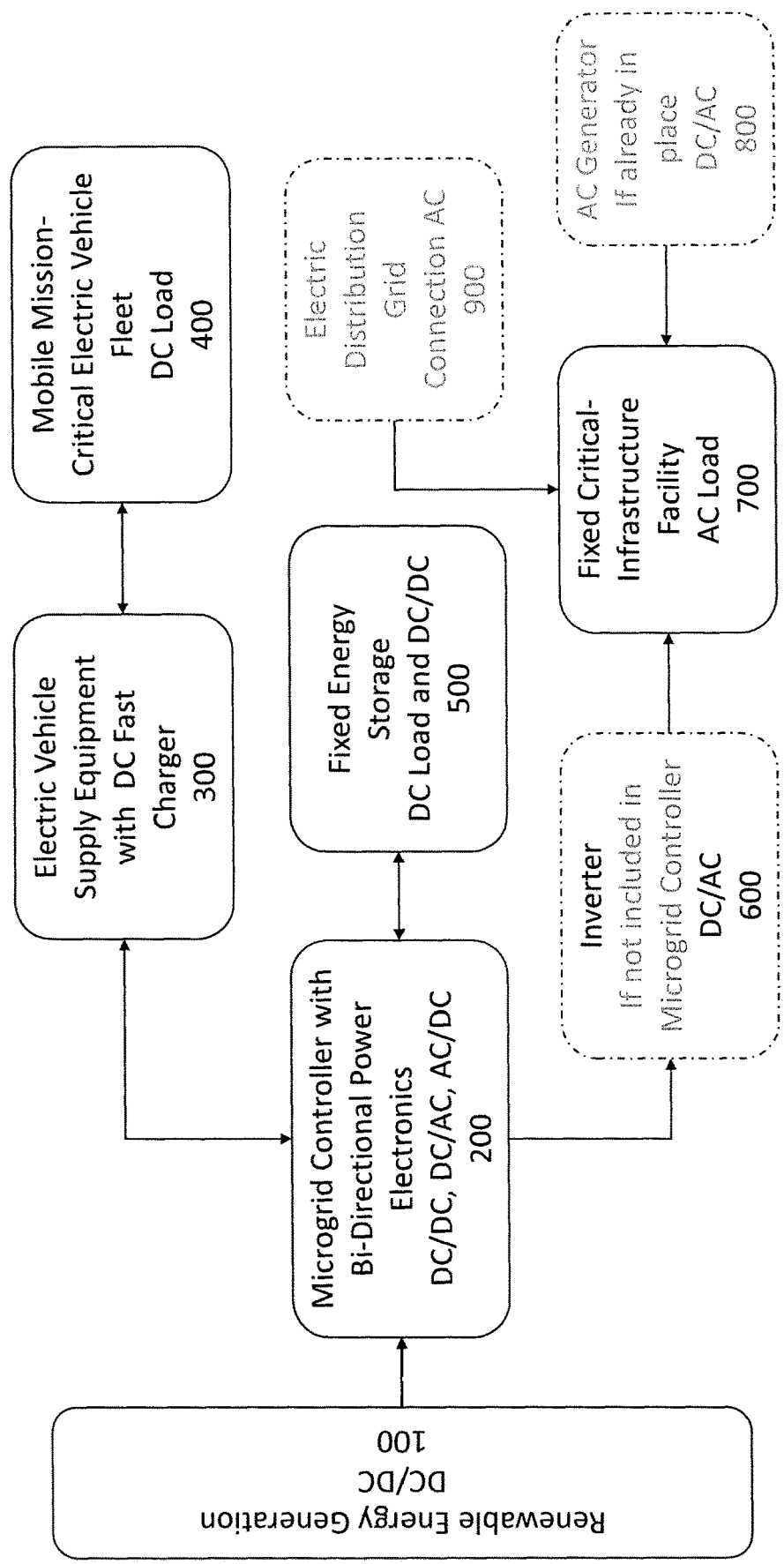

MISSION-CRITICAL MICROGRID

CROSS-REFERENCE TO RELATED APPLICATIONS

This application claims priority to U.S. Provisional Application No. 63/283,676 filed Nov. 29, 2021, the entirety of which is incorporated herein by reference.

FIELD OF THE INVENTION

The present invention relates to a mission-critical microgrid designed to serve municipalities and other entities with direct current (DC) power. The present invention is specifically related to a mission-critical microgrid that does not have to be connected to a typical power source and which relies on renewable energy generation. The present invention is more specifically related to a mission-critical microgrid that provides a charging source to accommodate the charging of mission-critical electric vehicles for daily use and also for rapid charging when said mission-critical electric vehicles are needed to respond to an emergency.

BACKGROUND OF THE INVENTION

Currently, a significant amount of the electrical power generated by utility companies utilize nonrenewable sources of energy (e.g., coal, petroleum, natural gas) to generate the electrical power. For a variety of reasons, it is prudent to wean away from nonrenewable sources of energy and utilize renewable sources of energy (e.g., solar, wind, etc.) to generate electrical power. With the advance of electric vehicles in everyday society, the need to utilize green electricity is needed to an even greater extent.

Electric vehicles are being integrated into and will eventually populate entire mission-critical emergency and disaster response fleets. Electric vehicle supply equipment and charging infrastructure have not been designed to support these special, mission-critical electric vehicle fleets. For example, police cars, fire engines, ambulances and snowplows need to be able to charge at any time, on any day regardless of the status of the electric grid and backup energy generators. Emergency service electric vehicles, especially large fire engines, will also have larger battery packs than regular passenger vehicles, and operators of these vehicles have a responsibility to be able to respond at a moment's notice, without having to wait hours for a charge of their battery pack.

Microgrids designed for the momentary peak demands of electric emergency response vehicle fleets require oversized storage capacity and highly variable charging capability compared to typical microgrids to meet this critical load. They are designed to use a combination of local, renewable energy generation, intelligent controls and power electronics, high-capacity fixed energy storage and high-power direct current (DC) fast charging up to the megawatt+ level which are necessary to support these emergency service electric vehicle fleets. Such a nuanced and special microgrid design is essential to ensure reliable and capable responses to emergencies and disasters by mission-critical electric vehicles.

SUMMARY OF THE INVENTION

An embodiment of the present invention provides a mission-critical microgrid, comprising: a renewable energy generator providing direct current (DC) power; a microgrid control and distribution unit connected to said renewable energy generator, wherein said microgrid control and distribution unit controls and distributes the DC power generated from the renewable energy generator; electric vehicle supply equipment connected to said microgrid control and distribution unit, wherein said microgrid control and distribution unit distributes DC power to said electric vehicle supply equipment, and wherein said electric vehicle supply equipment provides DC power to and from a mission-critical electric vehicle fleet; an energy storage system connected to said microgrid control and distribution unit, wherein said microgrid control and distribution unit distributes DC power to and from said energy storage system, and wherein said energy storage system stores DC power; and a critical infrastructure electric service equipment connected to said microgrid control and distribution unit with an integrated inverter, wherein said microgrid control and distribution unit distributes alternating current (AC) power to a critical infrastructure.

Another embodiment of the present invention provides a mission-critical microgrid as in any embodiment above, further comprising an inverter to convert the DC power produced by the renewable energy generator to AC power distributed from the microgrid control and distribution unit to the critical infrastructure electric service equipment and then to the critical infrastructure.

Another embodiment of the present invention provides a mission-critical microgrid as in any embodiment above, further comprising an AC generator to accept the AC power provided by the critical infrastructure electric service equipment to the critical infrastructure.

Another embodiment of the present invention provides a mission-critical microgrid as in any embodiment above, wherein the renewable energy generator is selected from the group consisting of a waterpower-based generator, a wind power-based generator, a solar power-based generator, and combinations thereof.

BRIEF DESCRIPTION OF THE DRAWINGS

For a more complete understanding of the features and advantages of the present invention, reference is now made to the detailed description of the invention along with the accompanying FIGURES in which:

FIG. 1 illustrates a simplified representation of a DC power system according to various aspects of the present invention.

DETAILED DESCRIPTION OF ILLUSTRATIVE EMBODIMENTS

The present invention provides a mission-critical microgrid designed to serve municipalities, and other entities, with emergency and disaster response capabilities and responsibilities. The mission-critical microgrid of the present invention will also support critical-infrastructure with resilient electrical energy and provide robust charging for mission-critical electric vehicle fleets. The mission-critical microgrid of the present invention is based on renewable, local energy generation producing direct current (DC) power which is distributed through bi-directional power control electronics to at least three loads: critical infrastructure, energy storage, and electric vehicles. Additional loads may include supporting the local electric distribution grid or powering an electrolyzer.

The mission-critical microgrid of the present invention is not only designed to provide an isolated source of power during disasters, but also to provide a resilient, robust, and reliable DC powered electric vehicle charging system for fleets with mission-critical responsibilities. The mission-critical microgrid of the present invention requires high-capacity storage to meet momentary peak demand from an all-electric vehicle fleet while also having flexible charging capabilities to accommodate regular daily use and critical loads up to the megawatt+ level. The mission-critical microgrid of the present invention includes a combination of capacity and capability which allows it to also power the critical infrastructure where mission-critical fleets operate from for extended periods. The mission-critical microgrid of the present invention can scale to accommodate higher charging rates and energy storage needs as more electric emergency response vehicles are added to the fleet. The resilient, reliable, and scalable mission-critical microgrid of the present invention is essential to facilitate the adoption of electric emergency response vehicles with mission-critical responsibilities by ensuring the mission-critical microgrid meets fleet charging demands and provides disaster-level resiliency to the whole emergency and disaster response system.

FIG. 1 illustrates a simplified representation of a DC power system 1000 according to various aspects of the present invention. The system 1000 includes a renewable energy generator 100, a microgrid control and distribution unit 200, electric vehicle supply equipment 300 that can be used to supply electricity to a mission-critical electric vehicle fleet 400, an energy storage system 500, and critical infrastructure electric service equipment 700. If not present in the microgrid control unit 200, it is also contemplated that the system 1000 can include an inverter 600 to convert the DC power to AC power to give AC power to the critical infrastructure electric service equipment 700. It is also contemplated that the critical infrastructure that the critical infrastructure electric service equipment 700 will supply power to will also have the ability draw emergency power from an AC generator 800, but that said AC generator 800 will not supply power to the microgrid control and distribution unit 200. Finally, it is also contemplated that the critical infrastructure that the critical infrastructure electric service equipment 700 will supply power to will also have the ability draw power from a traditional electrical distribution grid 900. In the embodiment shown in FIG. 1, the electrical distribution grid 900 does not supply any power to the microgrid control and distribution unit 200, or vice versa. However, it is also contemplated that in other embodiments, the system 1000 can be utilized to provide additional energy to the electrical distribution grid 900 on a as needed basis.

An important element of the system 1000 of the present invention is that the renewable energy generator 100, when combined with the energy storage system 500, generates all the power necessary to charge the mission-critical electric vehicle fleet 400 through the electric vehicle supply equipment 300. The system 1000 does not have to utilize any electrical power generated by the electrical distribution grid 900; said another way, the electrical power generated within the system 1000 is self-contained and does not have to rely on any outside sources of electrical power. Any power that is supplied to the critical infrastructure that does not come from the critical infrastructure electric service equipment 700 is not cycled back through the system 1000 and will remain self-contained within the critical infrastructure.

In one or more embodiments of the present invention, it is contemplated that the critical infrastructure electric service equipment 700 can be utilized to provide the AC power necessary to operate a critical infrastructure, such as a fire station or a police station. It is contemplated that the system 1000 can provide enough energy to completely power the critical infrastructure, or at least to offset the infrastructure energy demand.

The renewable energy generator 100 can be selected from the group consisting of a waterpower-based generator, a wind power-based generator, a solar power-based generator, and combinations thereof. If the renewable energy generator 100 is a waterpower-based generator, then the critical infrastructure that the critical infrastructure electric service equipment 700 is providing power to will have to be near a water-source to have access to enough water to provide the renewable energy generator 100 with the power needed. Additionally, if the renewable energy generator 100 is a wind power-based generator, then the critical infrastructure that the critical infrastructure electric service equipment 700 is providing power to will have to be near enough open-air space for wind-turbines to be able to be set up to have access to enough wind to provide the renewable energy generator 100 with the power needed. However, if the renewable energy generator 100 is a solar power-based generator, then the critical infrastructure that the critical infrastructure electric service equipment 700 is providing power to will just have to have enough room on the building's roof or on land adjacent the building to set up enough solar-panels to collect enough sunlight to provide the renewable energy generator with the power needed.

The microgrid control and distribution unit 200 takes in the energy created by the renewable energy generator 100 and then distributes the energy in the form of DC power to the electric vehicle supply equipment 300 and the energy storage system 500 while distributing the energy in the form of AC power to the critical infrastructure electric service equipment 700 either directly or first through the inverter 600. It is also contemplated that DC power stored in the energy storage system 500 can flow back to the microgrid control and distribution unit 200 so that the microgrid control and distribution unit 200 can send said stored DC power through to either the electric vehicle supply equipment 300 and/or the critical infrastructure electric service equipment 700.

It is also contemplated that DC power stored in the mission-critical electric vehicle fleet 400 can flow back to the microgrid control and distribution unit 200 so that the microgrid control and distribution unit 200 can send said stored DC power through to either the energy storage system 500 and/or the critical infrastructure electric service equipment 700.

The renewable energy generator 100 is connected to the microgrid control and distribution unit 200 through a DC coupling system.

The microgrid control and distribution unit 200 is connected to the electric vehicle supply equipment 300 through a DC bus system.

The microgrid control and distribution unit 200 is connected to the energy storage system 500 through a DC bus system.

The microgrid control and distribution unit 200 is connected either directly to the critical infrastructure electric service equipment 700 or optionally to the inverter 600 through an AC coupling system.

If present, the inverter 600 is connected to the critical infrastructure electric service equipment 700 through an AC coupling system.

The electric vehicle supply equipment 300 provides variable, managed charging for all of the primary, secondary and reserve electric vehicles in the mission-critical electric vehicle fleet 400. The number of electric vehicle charging stations of the electric vehicle supply equipment 300 will be based on the size of the mission-critical electric vehicle fleet 400, and they will have enough power to rapidly charge primary response vehicles in 15 to 30 minutes. Each electric vehicle charging station of the electric vehicle supply equipment 300 will have enough power to reach an 80% state of charge from zero for each primary response vehicle. The overall power of the electric vehicle supply equipment 300 is determined by multiplying the primary response vehicle charger power by the number of vehicles to be charged at one time. In addition, the electric vehicle charging stations of the electric vehicle supply equipment 300 will have the ability to meet daily and non-emergency demand by charging the remainder of the mission-critical electric vehicle fleet 400 at lower power over a longer duration.

The energy storage system 500 will be sized such that said system 500 can meet both the peak charging demands of the vehicles of the mission-critical electric vehicle fleet's critical load 400 as well as to, at a minimum, offset the energy demand of the infrastructure that is provided power through the critical infrastructure electric service equipment 700. In one or more embodiments, the energy storage system 500 is a battery energy storage system selected from the group consisting of a lithium-ion battery, a lead-acid battery, a vanadium redox flow battery, a zinc air battery, an iron air battery, and an iron flow battery, or other suitable energy storage system.

In one embodiment of the DC power system 1000 of the present invention, the critical infrastructure that the critical infrastructure electric service equipment 700 provides power to is a fire station. The renewable energy generator 100 is in the form of solar panels (specifically a 60-kW solar array) located on the roof of the fire station. The energy storage system 500 is a ground mounted battery energy storage system adjacent to the fire station. The microgrid control and distribution unit 200 is located on the fire station at a position generally between the solar panels of the renewable energy generator 100 and the ground mounted battery of the energy storage system 500. The electric vehicle supply equipment 300 is also located within the fire station and is used to charge the mission-critical electric vehicle fleet 400 which includes one staff vehicle with an 80 kWh battery pack, two ambulances each with 250 kWh battery packs, one fire engine with a 350 kWh battery pack, and one ladder truck with a 450 kWh battery pack. With these specific values in mind, the battery of the energy storage system 500 would need to be sized at 2.0 MWh of capacity and the electric vehicle supply equipment 300 would need to have an output of up to 1.4 Megawatts.

The total energy storage needed from the energy storage system 500 is the sum of each battery pack from each electric vehicle in the mission-critical electric vehicle fleet 400, with a factor of 0.5 to ensure there is enough energy to "fill up" each electric vehicle in the mission-critical electric vehicle fleet 400 at least once from energy stored in the energy storage system 500 only, while also leaving a reserve.

The DC power system 1000 of the abovementioned embodiment, specifically the solar panels of the renewable energy generator 100, the ground mounted battery of the energy storage system 500, and the electric vehicle supply equipment 300 are designed to match the loads presented by the specific vehicles mentioned above of the mission-critical electric vehicle fleet 400. The capacity and charging output of the energy storage system 500 allows for charging each vehicle of the mission-critical electric vehicle fleet 400 up to an 80% capacity within a time frame of 15 to 30 minutes.

In addition to providing the necessary charging infrastructure for the mission-critical electric vehicle fleet 400, the DC power system 1000 will also support the electrical power needs for the fire station from which the mission-critical electric vehicle fleet 400 operates. The renewable energy generator 100, ground mounted battery of the energy storage system 500, and/or the mission-critical electric vehicle fleet 400 may send electricity to the fire station through the critical infrastructure electric service equipment 700. This is especially true for the renewable energy generator 100 and the ground mounted battery of the energy storage system 500 when the mission-critical electric vehicle fleet 400 is not connected to the electric vehicle supply equipment 300, but they can still perform this task, even if the vehicle fleet 400 are connected. The electricity generated by the renewable energy generator 100, stored in the energy storage system 500, and sent to the fire station through the critical infrastructure electric service equipment 700 will assist in islanding the fire station from the electric distribution grid that typically would power the fire station. This will improve the resiliency of the fire station and the overall emergency response system.

In this example, the fire station that can be powered by the critical infrastructure electric service equipment 700, and the staff vehicle, two ambulances, one fire engine, and one ladder truck of the mission-critical electric vehicle fleet 400 consume approximately 7 MWh of electric energy per month. The 60-kW solar array of the renewable energy generator 100 can produce approximately 77 MWh of energy per year (when based in Northeast Ohio). Monthly kWh of generation from the renewable energy generator 100 will be able to offset roughly 90% of the fire stations electric energy needs when supplying the fire station with electricity through the critical infrastructure electric service equipment 700.

The microgrid control and distribution unit 200 of this example is designed to support low power DC charging of the mission-critical electric vehicle fleet 400 through the electric vehicle supply equipment 300 for routine operations. In addition, the microgrid control and distribution unit 200 is also designed to facilitate high-power DC charging of the mission-critical electric vehicle fleet 400 through the electric vehicle supply equipment 300 during or immediately after emergency situations.

In another embodiment of the DC power system 1000 of the present invention, the critical infrastructure that the critical infrastructure electric service equipment 700 provides power to is a single apparatus fire station. The renewable energy generator 100 is in the form of solar panels (specifically a 60-kW solar array) located on the roof of the fire station. The energy storage system 500 is a ground mounted battery energy storage system that is mounted next to the fire station. The microgrid control and distribution unit 200 is located at the fire station at a position generally between the solar panels of the renewable energy generator 100 and the ground mounted battery of the energy storage system 500. The electric vehicle supply equipment 300 is located within the fire station and used to charge the mission-critical electric vehicle fleet 400 which includes one utility vehicle utilizing a 120 kWh battery pack and one fire engine utilizing a 350 kWh battery pack. With this size of a mission-critical electric vehicle fleet 400, the battery of the energy storage system 500 would have a 750 kWh capacity and the electric vehicle supply equipment 300 would have an output of up to 1.1 Megawatts.

In another embodiment of the DC power system 1000 of the present invention, the critical infrastructure that the critical infrastructure electric service equipment 700 provides power to is a double apparatus fire station. The renewable energy generator 100 is in the form of solar panels (specifically a 60-kW solar array) located on the roof of the fire station. The energy storage system 500 is a ground mounted battery energy storage system that is mounted next to the fire station. The microgrid control and distribution unit 200 is located at the fire station at a position generally between the solar panels of the renewable energy generator 100 and the ground mounted battery of the energy storage system 500. The electric vehicle supply equipment 300 is located within the fire station and is used to charge the mission-critical electric vehicle fleet 400 which includes one fire engine utilizing a 350 kWh battery pack and one ladder truck utilizing a 450 kWh battery pack. With this mission-critical electric vehicle fleet 400, the battery of the energy storage system 500 would have a 1.2 MWh capacity and the electric vehicle supply equipment 300 would have an output of up to 1.4 Megawatts.

In another embodiment of the DC power system 1000 of the present invention, the critical infrastructure that the critical infrastructure electric service equipment 700 provides power to is a fire station. The renewable energy generator 100 is in the form of solar panels (specifically a 60-kW solar array) located on the roof of the fire station. The energy storage system 500 is a ground mounted battery energy storage system that is mounted next to the fire station. The microgrid control and distribution unit 200 is located at the fire station at a position generally between the solar panels of the renewable energy generator 100 and the ground mounted battery of the energy storage system 500. The electric vehicle supply equipment 300 is located within the fire station and used to charge the mission-critical electric vehicle fleet 400 which includes one utility vehicle utilizing a 120 kWh battery pack, two staff vehicles each with 80 kWh battery packs, three ambulances each utilizing a 250 kWh battery pack, one brush truck utilizing a 150 kWh battery pack, one fire engine utilizing a 350 kWh battery pack, one ladder truck utilizing a 450 kWh battery pack, and one water tender utilizing a 500 kWh battery pack. With this mission-critical electric vehicle fleet 400, the battery of the energy storage system 500 would have a 3.75 MWh capacity and the electric vehicle supply equipment 300 would have an output of up to 1.6 Megawatts.

In another embodiment of the DC power system 1000 of the present invention, the critical infrastructure that the critical infrastructure electric service equipment 700 provides power to is a municipal wastewater treatment plant. The renewable energy generator 100 is in the form of solar panels (specifically a 1.5 MW ground mounted solar array) located on land adjacent to the municipal service garage near the wastewater treatment plant. The energy storage system 500 is a ground mounted battery energy storage system mounted next to the service garage. The microgrid control and distribution unit 200 is located at the service garage at a position generally between the solar panels of the renewable energy generator 100 and the ground mounted battery energy storage system 500. Municipal emergency vehicle fleet deployment systems commonly allow vehicles of the mission-critical electric fleet 400 to be taken home by their operators when off duty. In order to support this type of a mission-critical electric vehicle fleet 400, the electric vehicle supply equipment 300 must be able to charge the vehicles of the fleet 400 on an as-needed basis with enough power to return a vehicle of the fleet 400 to service in 15 minutes or less. Therefore, the electric vehicle supply equipment 300 will be in the form of a high-power DC fast charging depot to charge the mission-critical electric vehicle fleet 400 made up of two patrol cars with 80 kWh battery packs with varying demands. Such a microgrid 1000 will also be inherently capable of offsetting energy use of the wastewater treatment plant through the critical infrastructure electric service equipment 700. With this type of mission-critical electric vehicle fleet 400, the battery of the energy storage system 500 would have a 280 kWh capacity and the electric vehicle supply equipment 300 would have an output of up to 256 kW.

In another embodiment of the DC power system 1000 of the present invention, the critical infrastructure that the critical infrastructure electric service equipment 700 provides power to is a municipal police station. The renewable energy generator 100 is in the form of solar panels (specifically a 60-kW solar array) located on the roof of the police station. The energy storage system 500 is a ground mounted battery energy storage system that is mounted next to the police station. The microgrid control and distribution unit 200 is located at the police station at a position generally between the solar panels of the renewable energy generator 100 and the ground mounted battery of the energy storage system 500. The electric vehicle supply equipment 300 is also located adjacent the police station and is used to charge the mission-critical electric vehicle fleet 400 which includes six patrol cars with 80 kWh battery packs needing to be charged in-between shifts. With this mission-critical electric vehicle fleet 400, the battery of the energy storage system 500 would have a 750 kWh capacity. The officers are assigned to shared patrol cars within the mission-critical electric vehicle fleet 400 and are working eight-hour shifts, requiring simultaneous quick charging through the electric vehicle supply equipment 300 three times per day. Many days the demand on the electric vehicle supply equipment 300 is only at 60 kW from the 750 kWh battery energy storage system 500; however, during a disaster situation or extended incident, the demand on the electric vehicle supply equipment 300 will have the ability to ramp up to 256 kW. Adding in two administrative and two detective staff vehicles to the mission-critical electric vehicle fleet 400 each with 80 kWh battery packs will require the battery energy storage system 500 to have additional storage capacity, specifically the battery of the energy storage system 500 would increase to 1 MWh of capacity. With this complete mission-critical electric vehicle fleet 400, the battery of the energy storage system 500 would have a 1 MWh capacity and the electric vehicle supply equipment 300 would have an output of up to 256 kW.

In another embodiment of the DC power system 1000 of the present invention, the critical infrastructure that the critical infrastructure electric service equipment 700 provides power to is a police station. The renewable energy generator 100 is in the form of solar panels (specifically a 1-MW solar array) located over the parking lots surrounding the police station. The energy storage system 500 is a ground mounted battery energy storage system that is mounted next to the police station. The microgrid control and distribution unit 200 is located at the police station at a position generally between the solar panels of the renewable energy generator 100 and the ground mounted battery of the energy storage system 500. The electric vehicle supply equipment 300 is also located adjacent the police station and is used to charge the mission-critical electric vehicle fleet 400 which includes sixteen patrol cars with 128 kWh battery packs needing to be charged in-between shifts. With this mission-critical electric vehicle fleet 400, the battery of the energy storage system 500 would have a 3.1 MW capacity. The officers are assigned to shared patrol cars within the mission-critical electric vehicle fleet 400 and are working eight-hour shifts, requiring simultaneous quick charging through the electric vehicle supply equipment 300 demanding up to 400 kW of power three times per day. In addition, there are also four administrative and six detective staff vehicles to the mission-critical electric vehicle fleet 400 each with 80 kWh battery packs requiring the battery energy storage system 500 to have additional storage capacity, specifically the battery of the energy storage system 500 would increase to 4.3 MWh of capacity. With this complete mission-critical electric vehicle fleet 400, the battery of the energy storage system 500 would have a 4.3 MWh capacity and the electric vehicle supply equipment 300 would have an output of up to 400 kW.

In light of the foregoing, it should be appreciated that the present invention significantly advances the art by providing a mission-critical microgrid that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A mission-critical microgrid, comprising:
   a. a renewable energy generator generating and providing direct current (DC) power;
   b. a microgrid control and distribution unit connected to said renewable energy generator, wherein said microgrid control and distribution unit controls and distributes the DC power generated from the renewable energy generator;
   c. electric vehicle supply equipment connected to said microgrid control and distribution unit, wherein said microgrid control and distribution unit distributes DC power to said electric vehicle supply equipment, and wherein said electric vehicle supply equipment provides DC power to a mission-critical electric vehicle fleet;
   d. an energy storage system connected to said microgrid control and distribution unit, wherein said microgrid control and distribution unit distributes DC power to said energy storage system, and wherein said energy storage system stores DC power; and
   e. a critical infrastructure electric service equipment connected to said microgrid control and distribution unit, wherein said microgrid control and distribution unit distributes alternating current (AC) power to a critical infrastructure.

2. The mission-critical microgrid of claim 1, further comprising an inverter to convert the DC power produced by the renewable energy generator to AC power distributed from the microgrid control and distribution unit to the critical infrastructure electric service equipment and then to the critical infrastructure.

3. The mission-critical microgrid of claim 1, further comprising an AC generator to accept the AC power provided by the critical infrastructure electric service equipment to the critical infrastructure.

4. The mission-critical microgrid of claim 1, wherein the renewable energy generator is selected from the group consisting of a waterpower-based generator, a wind power-based generator, a solar power-based generator, and combinations thereof.

* * * * *